United States Patent [19]
Swisher, Jr.

[11] Patent Number: 5,405,421
[45] Date of Patent: Apr. 11, 1995

[54] GAS STREAM FILTERING SYSTEM USING FILTERED GAS FOR REVERSE FLOW CLEANING

[76] Inventor: George W. Swisher, Jr., 1500 Dorchester Dr., Oklahoma City, Okla. 73120

[21] Appl. No.: 124,896

[22] Filed: Sep. 22, 1993

[51] Int. Cl.⁶ .............................................. B01D 46/00
[52] U.S. Cl. ...................................... 55/284; 55/303; 55/338; 55/341.1; 95/279
[58] Field of Search ................. 55/284, 294, 302, 303, 55/338, 339, 340, 341.1, 341.2, 341.3; 95/279, 280

[56] References Cited

U.S. PATENT DOCUMENTS

| | | | |
|---|---|---|---|
| 2,836,256 | 5/1958 | Caskey | 55/303 |
| 3,078,646 | 2/1963 | Leech et al. | 55/303 |
| 3,345,806 | 10/1967 | Bullock et al. | 55/303 |
| 3,898,062 | 8/1975 | Slakey | 55/303 |
| 3,975,173 | 8/1976 | Peterson et al. | 55/303 |
| 4,233,041 | 11/1980 | Noland | 55/294 |
| 4,364,749 | 12/1982 | Dunseith | 55/303 |
| 4,507,130 | 3/1985 | Roth | 55/284 |
| 4,668,253 | 5/1987 | Lonardi et al. | 55/303 |
| 4,681,607 | 7/1987 | Bollerhey | 55/303 |
| 5,174,797 | 12/1992 | Yow, Sr. et al. | 55/303 |

FOREIGN PATENT DOCUMENTS

| | | | |
|---|---|---|---|
| 2931403 | 3/1980 | Germany | 55/303 |
| 62-152512 | 7/1987 | Japan | 55/284 |

OTHER PUBLICATIONS

Prior art brochure published by CMI Corporation, entitled "CMI Roto-Aire ®Baghouses."

Primary Examiner—Charles S. Bushey
Attorney, Agent, or Firm—Dunlap & Codding

[57] ABSTRACT

A fabric-filter baghouse using heated, filtered exhaust gas for reverse-flow cleaning of fabric filter bags. The baghouse includes a housing having an inlet chamber and an outlet chamber therein, a number of fabric filter bags mounted between the inlet chamber and the outlet chamber and an exhaust fan for drawing a stream of gases through the baghouse. The interior of the filter bags communicate with the outlet chamber and the exterior of the filter bags are disposed in the inlet chamber. The filter bags are constructed to prevent particulate from passing from the exterior to the interior of the filter bags, while allowing the gas stream to do so. Particulate which collects on the exterior of the filter bags is removed by passing a reverse flow of gases through the filter bags. One or more rotary valves are provided to direct a reverse flow of gases to one group of filter bags at a time. A reverse flow supply duct extends from the exhaust duct to the rotary valves to provide heated, filtered exhaust gases for reverse flow cleaning of the filter bags. In one embodiment, the reverse flow supply duct communicates with the inlet chamber to effect a continuous, trickle gas flow through the reverse flow supply duct. In another embodiment, a return duct extends to reverse flow supply duct back to the exhaust duct to effect a continuous gas flow through the reverse flow supply duct.

8 Claims, 3 Drawing Sheets

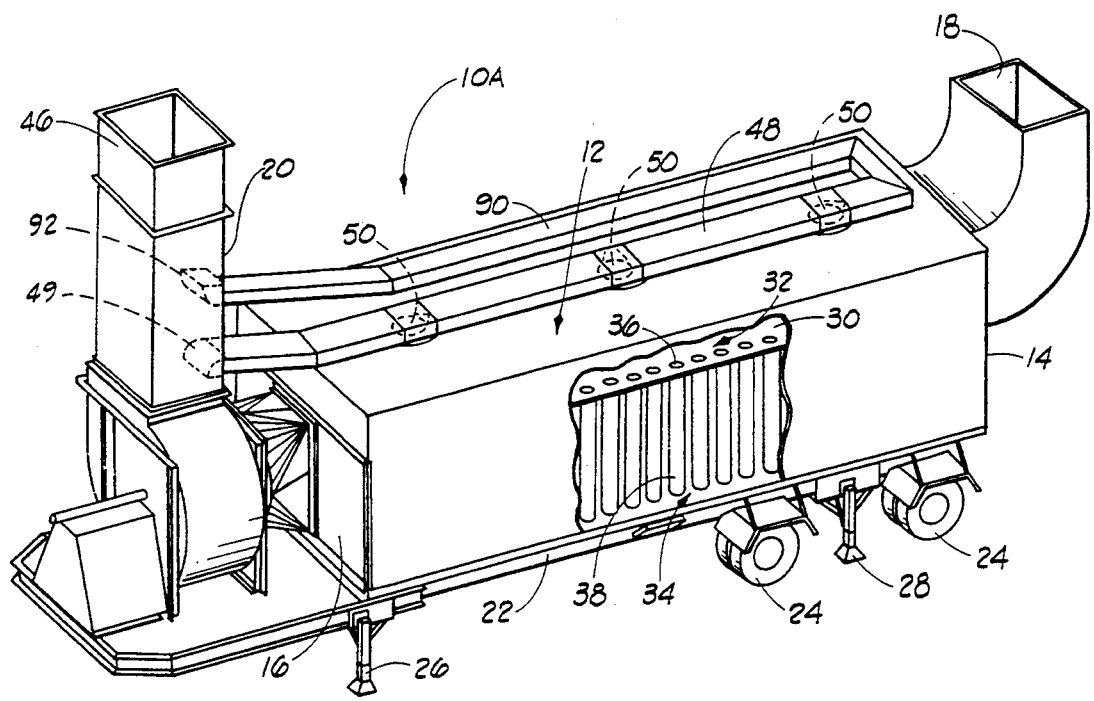
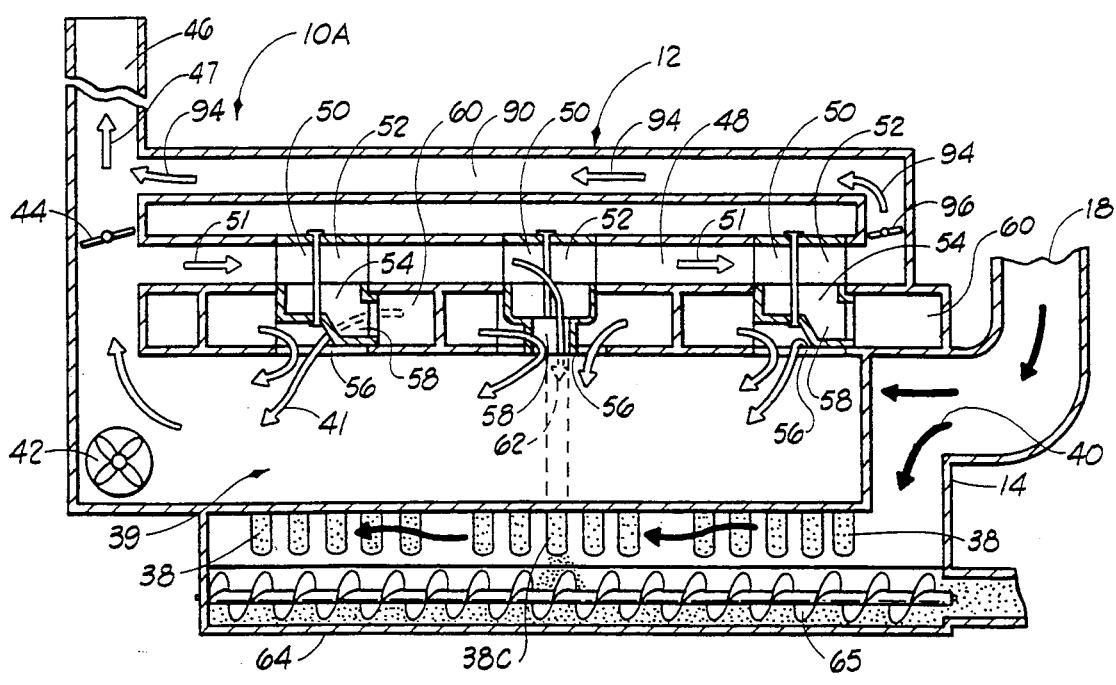
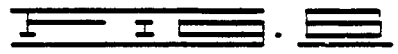

GAS STREAM FILTERING SYSTEM USING FILTERED GAS FOR REVERSE FLOW CLEANING

BACKGROUND OF THE INVENTION

1. Field of the Invention

The present invention relates generally to gas stream cleaning systems, and particularly, but not by way of limitation, to filter bag systems for removing particulate from a gas stream.

2. Description of Related Art

In the art of asphalt production, the baghouse or "fabric filter" dust collector is well known. The baghouse is placed between the drum and the exhaust fan, so that exhaust gases from the drum are drawn through the baghouse.

Inside a typical baghouse, a number of fabric filter bags are suspended into a "dirty" chamber with the open ends of the filter bags communicating with a separate "clean" chamber. Elongated wire cages extend into the filter bags to hold the bags open. As the exhaust gas is drawn through the baghouse, the exhaust gas passes through to the inside of the filter bags but particulate is caught on the outside of the filter bags.

As particulate gathers on the outside of the filter bags, gas flow through the filter bags becomes impeded. In order to maintain proper gas flow through the baghouse, the filter bags must be periodically cleaned to remove particulate build-up.

One way to clean the filter bags is the reverse air method. In using this method, the filter bags are divided into a number of groups. Typically, one group of filter bags at a time is taken "off-stream" for cleaning, while the other groups remain in the normal filtering mode. The off-stream filter bags are cleaned by drawing air through the filter bags from the inside to the outside to force particulate from the outside of the filter bags.

The cleaning air used in conventional reverse air baghouses is ambient air. There are some drawbacks, however, in utilizing ambient air for reverse flow cleaning of filter bags.

One disadvantage in using ambient air for filter cleaning is the moisture content of ambient air. In order to filter properly and to be cleaned, the filter bags must be kept dry. The moisture in ambient air may cause particulate to adhere to the filter bags and adversely affect the cleaning of the filter bags.

Another problem with ambient air as the filter cleaning supply is the temperature of ambient air. For proper operation of the baghouse, it is important to control the baghouse temperature, which is typically in the range of 220 to 350 degrees Fahrenheit. By introducing ambient air at a temperature of around 50 to 120 degrees Fahrenheit into the baghouse, for example, the desired operating temperature of the baghouse is compromised.

SUMMARY OF THE INVENTION

The present invention is a gas stream filtering system using hot, clean exhaust gas for reverse cleaning of the filters. The system includes a housing having an inlet chamber and an outlet chamber, a plurality of filters mounted in the housing, an exhaust fan for drawing a gas stream through the housing and rotary valves for alternately placing groups of the filters off-stream for cleaning.

One object of the present invention is to eliminate the possibility of condensing cold ambient air in the filters during the reverse-cleaning cycle.

Another object of the present invention is to clean the filter bags with gases which contain less oxygen than ambient air.

Yet another object of the present invention is to use gases which are hotter than ambient air to clean the filter bags in order to reach and maintain the proper operating temperature for the baghouse.

Other objects, features and advantages of the present invention are apparent from the following detailed description when read in conjunction with the accompanying drawings and appended claims.

BRIEF DESCRIPTION OF THE DRAWINGS

FIG. 5 is a perspective view of an alternate embodiment of a baghouse constructed in accordance with the present invention. A portion of the baghouse is cut away to show some of the filter bags.

FIG. 6 is a partly diagrammatical, partly sectional view of the baghouse of FIG. 5.

DETAILED DESCRIPTION OF THE PREFERRED EMBODIMENTS

Figure 1:
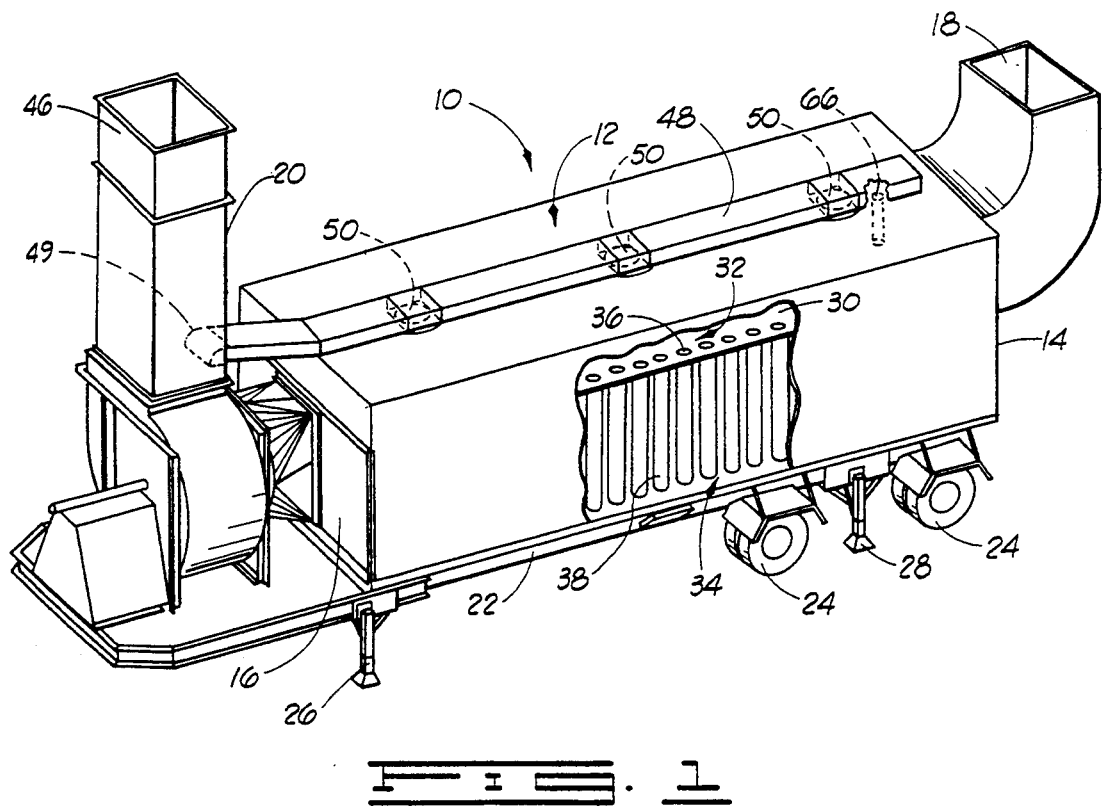
FIG. 1 is a perspective view of a baghouse constructed in accordance with the present invention. A portion of the baghouse is cut away to show some of the filter bags.

Referring to the drawings in general, and to FIG. 1 in particular, shown therein and designated by the general reference humeral 10 is a baghouse, which includes a housing 12 having an inlet end 14 and a discharge end 16. An intake duct 18 is provided at the inlet end 14 to receive a particulate-laden gas stream into the housing 12. An exhaust duct 20 is located at the discharge end 16 to receive particulate-free gas from the housing 12.

The phrase "particulate-laden gas stream" is defined herein as a gas stream in which particles of dust, debris, contaminants and the like are entrained in the gas stream.

The term "particulate-free" is used herein to mean the virtual absence of particles larger than a predefined size. For example, a typical well-maintained baghouse may trap virtually all particles larger than 10 microns and between 75% to 99% of all particles smaller than 10 microns.

The baghouse 10 may be used to filter dust and contaminants from any gaseous stream. A typical application for the baghouse 10 is in filtering dust and contaminants from the exhaust of a mixer or dryer drum in a hot mix asphalt plant.

The housing 12 is supported on a frame 22 which is adapted for towing the baghouse 10 from one location to another. Sets of wheels 24 are mounted to the frame 22 for transporting the baghouse 10. Front jack stands 26 and rear jack stands 28 are attached to the frame 22 for stabilizing the baghouse 10 for operation.

It should be appreciated that the baghouse 10 may also be constructed as a stationary unit. In particular, baghouses which exceed the maximum size limit for highway travel are built on-site as stationary units.

The housing 12 is divided by a separating wall 30 into an upper outlet chamber 32 and a lower inlet chamber 34. A plurality of filter bag slots extend through the separating wall 30. One of the filter bag slots is designated by reference numeral 36 and is generally representative of the filter bag slots in the separating wall 30.

A filter bag may be inserted into each filter bag slot 36 to extend down into the inlet chamber 34. One of the filter bags is designated by reference numeral 38 and is generally representative of the filter bags suspended in the baghouse 10. The filter bags 38 are typically the conventional woven, felt or felt/woven fabric type supported by a wire cage inside the bag.

The filter fabric allows gases to pass through, but is dense enough to trap dust and contaminants. The filter bags 38 have one end which opens to the outlet chamber 32. Accordingly, the outside of each filter bag 38 is exposed to the inlet chamber 34 while the inside of each filter bag 38 communicates with the outlet chamber 32.

Figure 2:
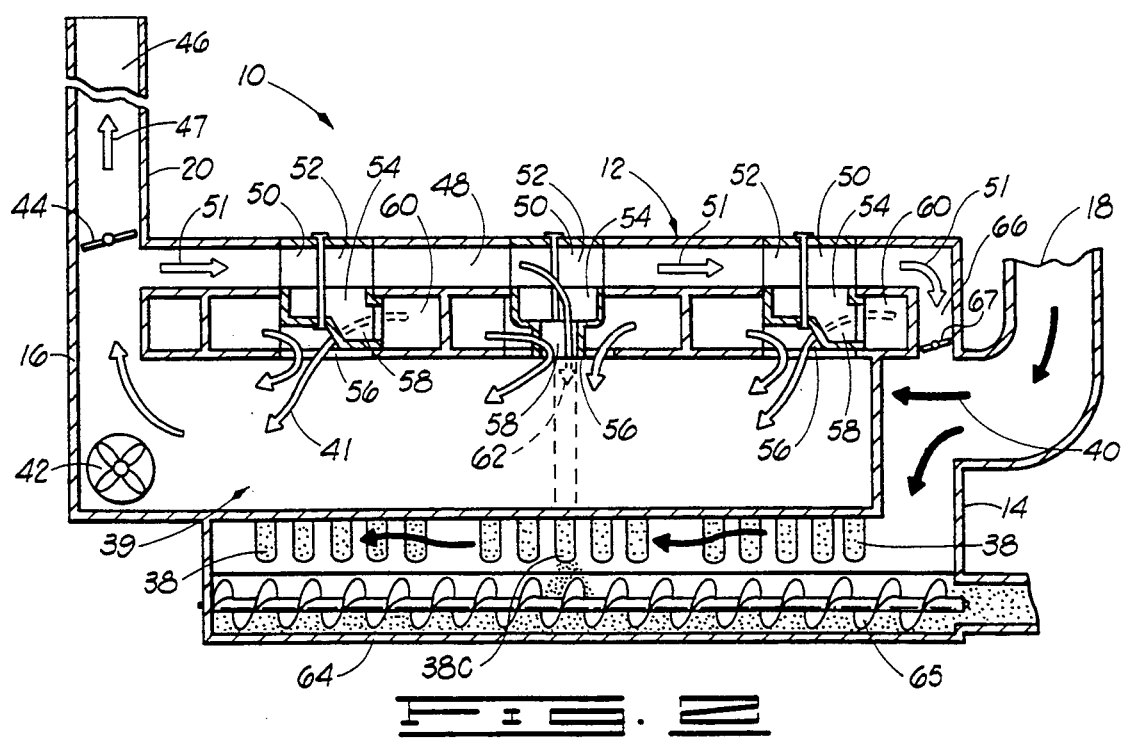
FIG. 2 is a partly sectional, partly diagrammatical view of the baghouse of FIG. 1.

Referring now to FIG. 2, shown therein is a partly diagrammatical, partly sectional view of the baghouse 10. An outlet plenum 39 extends through a medial area of the housing 12 from the discharge end 16 toward the in]Let end 14 of the baghouse 10. One end of the outlet plenum 39 communicates with the exhaust duct 20.

In FIG. 2 and in all of the drawing figures, solid direction arrows generally represent the flow path of a particulate-laden gas stream and hollow direction arrows indicate the flow path of a particulate-free gas stream. For example, solid direction arrow 40 indicates particulate-laden gas entering the inlet chamber 34 of the housing 12. Hollow direction arrow 41 indicates a particulate-free gas stream flowing from the outlet chamber 32 into the outlet plenum 39.

An exhaust fan 42 is provided to draw a gaseous stream through the housing 12 and into the exhaust duct 20. An exhaust damper 44 is operatively installed in the exhaust duct 20 to adjust the volume of exhaust gas released to an exhaust stack 46.

As shown in FIGS. 1 and 2, a cleaning gas supply duct 48 extends along the top of the housing 12 from the exhaust duct 20 toward the inlet end 14 of the baghouse 10. The cleaning gas supply duct 48 terminates in a cleaning gas supply hood 49 (FIG. 1), which has a downward directed opening positioned within the exhaust duct 20. As indicated by direction arrows 51, an exhaust gas stream is drawn by the exhaust fan 42 from the exhaust duct 20 through the cleaning gas supply duct 48.

A plurality of rotary valves 50 are mounted to the top of the housing 12 in a spaced arrangement and in communication with the cleaning gas supply duct 48. Left, right and center rotary valves 50 are shown in the drawing figures.

Each rotary valve 50 has a stationary upper intake end 52, a rotary valve member 54 and a lower bypass end 56. The intake end 52 communicates with the cleaning gas supply duct 48 and the bypass end 56 communicates with the outlet plenum 39.

Each rotary valve member 54 communicates with the intake end 52 of the corresponding rotary valve 50 to receive clean exhaust gas from the cleaning gas supply duct 48. In addition, each rotary valve member 54 has a rotary valve outlet 58 which directs flow radially from the corresponding rotary valve 50. It should be appreciated that the rotary valve member 54 is rotatable to a plurality of positions. In each position of the rotary valve member 54, the rotary valve outlet 58 directs flow radially outward to one sector of its rotation at a time.

By way of illustration in FIG. 2, the left rotary valve 50 is associated with the five left-most filter bags 38, the center rotary valve 50 is associated with the middle five filter bags 38 and the right rotary valve 50 is associated with the right-most five filter bags 38. The left and right rotary valves 50 are positioned to direct their valve outlets 58 to a blind channel 60. In this position, the "parked" position, the left and right rotary valves 50 are allowing no flow from the cleaning gas supply duct 48 into the corresponding filter bags 38.

Accordingly, all five left-most filter bags 38, which are in communication with left rotary valve 50, are in the normal, filtering mode. Similarly, all five right-most filter bags 38, which are in communication with the right rotary valve 50, are also in the filtering mode.

In contrast, the rotary valve member 54 of the center rotary valve 50 is rotated to direct its valve outlet 58 to the center filter bag 38C. Thus filtered exhaust gas from the cleaning gas supply duct 48 flows through the center rotary valve 50 and into the filter bag 38C, as indicated by direction arrow 62. The flow of the exhaust gas into the filter bag 38C forces particulate from the exterior of the filter bag 38C to clean the filter bag 38C.

Particulate falls from the filter bag 38C into the bottom of the housing 12. A pair of dust bins 64, one on each side, are provided in the bottom of the housing 12 to receive the particulate cleaned from the filter bags 38. A rotatable dust auger 65 extends substantially throughout the length of each dust bin 64 to remove the particulate from the dust bins 64.

The left, right and center rotary valves 50 may be positioned in the cleaning mode often enough to provide a flow which is continuous enough to prevent condensation within the reverse cleaning components. If the reverse cleaning cycles are not frequent, however, lack of reverse flow may allow condensation to occur within the reverse cleaning components.

To avoid the possibility of condensation caused by infrequent flow through the reverse cleaning components, an auxiliary duct 66 may be provided to ensure continuous flow through the reverse cleaning components, which include the rotary valves 50 and the cleaning gas supply duct 48.

As illustrated by FIG. 2, the auxiliary duct 66 connects the cleaning gas supply duct 48 with the inlet chamber 34 of the housing 12. With this construction, a continuous flow is maintained with respect to the reverse cleaning components, even when none of the rotary valves 50 are set to one of the reverse cleaning positions.

An auxiliary valve 67 may be located in the auxiliary duct 66 to adjust the amount of flow from the supply duct 48 into the inlet chamber 34. Typically, this flow is minimal because only a slight flow is required to prevent condensation in the reverse cleaning components.

The auxiliary valve 67 is also indicative of a check valve, which may be located in the auxiliary duct 66 to prevent the particulate-laden gas of the inlet chamber 34 from entering the auxiliary duct 66. The check valve 67 is an added safeguard because the negative pressure of the baghouse 10 normally prevents flow from the inlet chamber 34 into the auxiliary duct 66.

Figure 3:
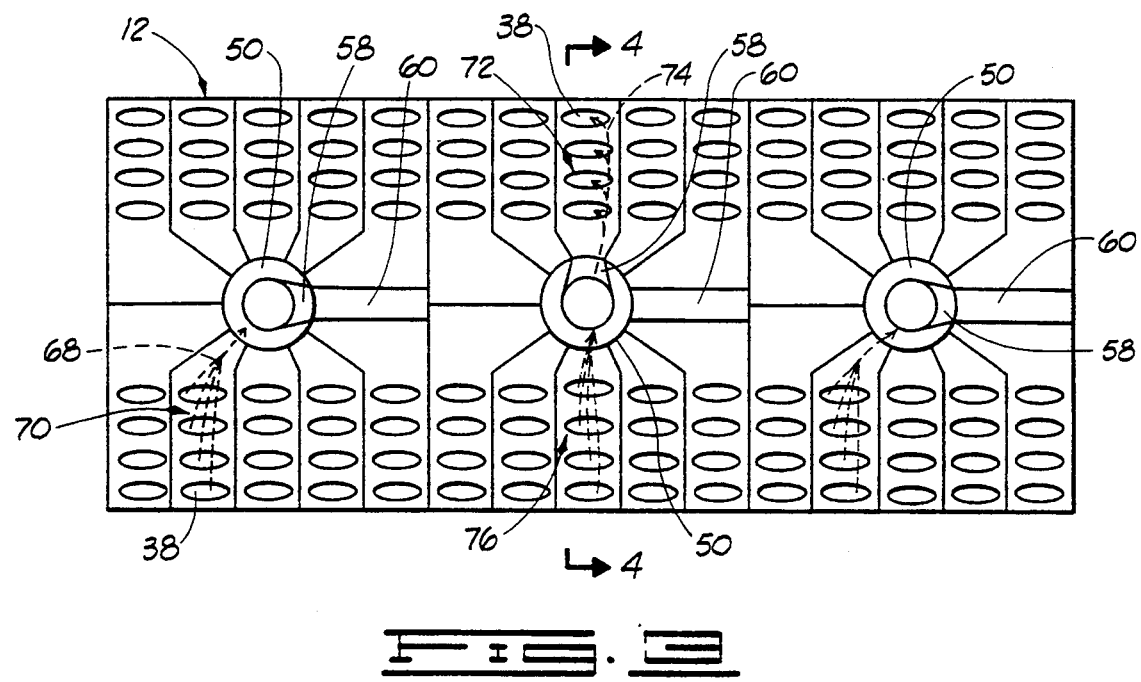
FIG. 3 is a diagrammatical top plan view of the baghouse of FIG. 1.

Referring now to FIG. 3, shown therein is the arrangement of rotary valves 50 and the filter bags 38. The filter bags 38 are arranged in rows and each row of the filter bags 38 has a separate channel to the corresponding rotary valve 50. For clarity of illustration, each row is shown to have four filter bags 38 and there are ten rows, five rows on each side, communicating with each rotary valve 50.

It should be appreciated that the number of filter bags 38 in each row may be varied and that each row need not contain the same number of filter bags 38. In addition, it should be understood that the number of rotary valves 50 in the baghouse 10 and number of rows communicating with each rotary valve 50 may vary. For example, a typical baghouse 10 may include three rotary valves 50, 18 channels to the rows and 14 bag slots 36 in each row. Filter bags 38 may be inserted into all of the bag slots 36 or just into a selected number bag slots 36. Bag slots 36 not used for a filter bag 38 are closed with a bag slot cover (not shown).

The left and right rotary valves are parked. That is, the rotary valve outlet 58 of the left and right rotary valves 50 is directed into the corresponding blind channel 60. In this position, all of the filter bags 38 communicating with the left and right rotary valves 50 are in the filtering mode. As indicated by the dashed lines 68 in row 70, a particulate-free gas stream is drawn from the inside of each filter bag 38, through the left and right rotary valves 50 and into the out]Let plenum 39.

The center rotary valve 50, however, is not in the parked position. Thus one row 72 of filter bags 38 communicating with center rotary valve 50 is in the cleaning mode. Particulate-free exhaust gas enters the intake end 52 of center rotary valve 50 and is directed into the row 72 of filter bags 38 by the rotary valve outlet 58 of the center rotary valve 50, as indicated by direction arrows 74. With the exception of row 72, all the rows of filter bags 38 communicating with the center rotary valve 50 are in the filtering mode, like all of the rows of communicating with the left and right rotary valves 50.

Figure 4:
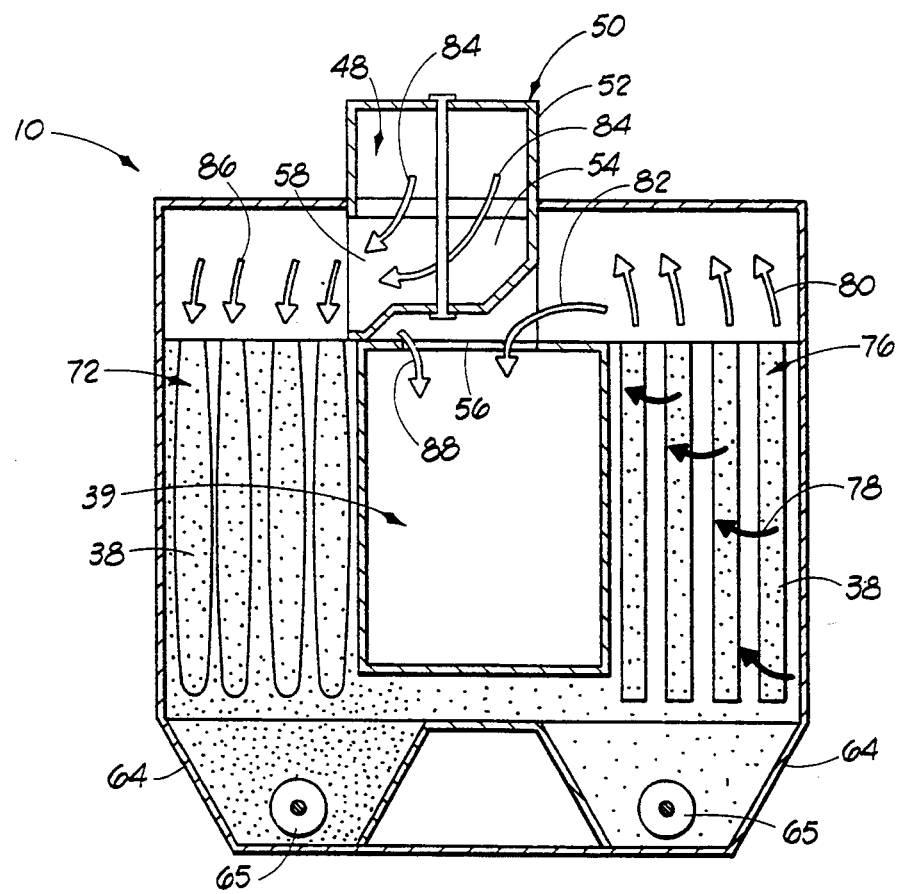
FIG. 4 is a partly diagrammatical sectional view taken along the lines 4—4 of FIG. 3.

With reference now to FIG. 4, shown therein are two rows 72 and 76 of filter bags 38 on opposite sides of the outlet plenum 39. The filter bags 38 on the right are in the normal filtering mode, while the filter bags 38 on the left are being cleaned by reverse flow.

Focusing first on the right-side filter bags 38, particulate-laden gas is indicated generally by solid arrows, one of which is designated by reference numeral 78. The particulate-laden gas is drawn to the exterior of the right-side filter bags 38. The weave or mesh of the right-side filter bags 38 is tight enough that the particulate is trapped on the outside of the right-side filter bags 38. The gas passes through to the inside of the right-side filter bags 38.

As indicated generally by hollow direction arrows, one of which is designated by reference numeral 80, particulate-free gas is drawn from the inside of the right-side filter bags 38 into the channel corresponding to the row of right-side filter bags 38. From the channel, the particulate-free gas travels past the bottom of the corresponding rotary valve 50 and into the outlet plenum 39, as indicated by direction arrow 82.

Turning to the left-side filter bags 38 in FIG. 4, exhaust gas is being drawn through the left-side filter bags 38 in the reverse direction, that is, from the inside to the outside of the filter bags 38. This reverse gas flow typically forces the fabric outward from the cages, as illustrated by the slight inflation of the left-side filter bags 38 in FIG. 4.

The reverse gas flow forces particulate from the outside of the left-side filter bags 38 and the particulate accumulates in the left-side dust bin 64 at the bottom of the baghouse 10. The left-side dust auger 65 removes the particulate from the left-side dust bin 64 for disposal.

As indicated generally by hollow direction arrows 84, the reverse cleaning gas is exhaust gas obtained from the cleaning gas supply duct 48. The cleaning gas passes from the supply duct 48 through the center rotary valve 50 and out of the rotary valve outlet 58 into the channel corresponding to the row 72 of left-side filter bags 38. The cleaning gas is drawn from the channel into the left-side filter bags 38, as indicated by four hollow direction arrows, one of which is designated by reference numeral 86.

Embodiment of FIGS. 5 and 6

With reference now to FIGS. 5 and 6, shown therein and designated by reference character 10A is an alternate embodiment of a baghouse constructed in accordance with the present invention. As shown in these figures, the baghouse 10A includes a return duct 90 which extends from the end of the cleaning gas supply duct 48 back to the exhaust duct 20.

As shown in FIG. 6, the cleaning gas supply duct 48 connects to the exhaust duct 20 ahead of the exhaust damper 44 and the return duct 90 connects to the exhaust duct 20 behind the exhaust damper 44. The return duct 90 terminates in a return hood 92 (FIG. 5), which has an upwardly directed opening positioned within the exhaust duct 20.

With this construction, a "trickle flow" of filtered exhaust gas circulates from the exhaust duct 20 through the clean gas supply duct 48 and through the return duct 90 back to the exhaust duct 20. The trickle flow of exhaust gas back to the exhaust duct 20 is indicated by direction arrows 94. In order to adjust the amount of the trickle flow 94, a flow control valve 96 may be mounted within the return duct 90.

By maintaining a continuous "trickle flow" in this manner, condensation is less likely to occur within the reverse cleaning components and structures. Preventing moisture in the baghouse 10A enhances the cleaning of the filter bags 38, increases the filtering efficiency of the filter bags 38 and prolongs the life of the filter bags 38.

It should be appreciated that the baghouse 10A may be constructed with both the auxiliary duct 66 shown in FIG. 2 and the return duct 90. The auxiliary duct 66 and the return duct 90 have the same purpose for providing a continuous flow through the reverse cleaning components to prevent condensation and the introduction of moisture into the baghouse 10 or 10A.

Changes may be made in the combinations, operations and arrangements of the various parts and elements described herein without departing from the spirit and scope of the invention as defined in the following claims.

What is claimed is:

1. An apparatus for removing particulate from a particulate-laden gas stream, the apparatus comprising:
   a housing having an inlet chamber and an outlet chamber therein;
   a plurality of filters mounted within said housing, each one of said filters having a substantially particulate-free side communicating with the outlet chamber and a particulate-trapping side exposed to the inlet chamber;
   exhaust means for drawing a particulate-laden gas stream into the inlet chamber of said housing and a substantially particulate-free gas stream out of the outlet chamber of said housing, said exhaust means having an exhaust duct for receiving the particulate-free gas stream from the outlet chamber of said housing;

a plurality of rotary valves, each one of said rotary valves communicating with the particulate-free side of corresponding sets of said filters, said rotary valves being movable into a plurality of reverse flow positions, each reverse flow position directing a reverse gas stream from said exhaust duct into the particulate-free side of a corresponding set of said filters to remove particulate from the particulate-trapping side of said corresponding set of filters; a supply duct connecting said rotary valves with the exhaust duct to supply said rotary valves with exhaust gases to reverse flow clean said filters; and an auxiliary duct connecting said supply duct with the inlet chamber of said housing.

2. The apparatus of claim 1 further comprising:

an auxiliary valve located within said auxiliary duct to adjust flow from said supply duct into the inlet chamber of said housing.

3. The apparatus of claim 1 further comprising:

a check valve positioned within said auxiliary duct to prevent flow from the inlet chamber of said housing into said supply duct.

4. An apparatus for removing particulate from a particulate-laden gas stream, the apparatus comprising:

a housing having an inlet chamber and an outlet chamber therein;

a plurality of filters mounted within said housing, each one of said filters having a substantially particulate-free side communicating with the outlet chamber and a particulate-trapping side exposed to the inlet chamber;

exhaust means for drawing a particulate-laden gas stream into the inlet chamber of said housing and a substantially particulate-free gas stream out of the outlet chamber of said housing, said exhaust means having an exhaust duct for receiving the particulate-free gas stream from the outlet chamber of said housing;

a plurality of rotary valves, each one of said rotary valves communicating with the particulate-free side of corresponding sets of said filters, said rotary valves being movable into a plurality of reverse flow positions, each reverse flow position directing a reverse gas stream from said exhaust duct into the particulate-free side of a corresponding set of said filters to remove particulate from the particulate-trapping side of said corresponding set of filters;

a supply duct connecting said rotary valves with the exhaust duct to supply said rotary valves with exhaust gases to reverse flow clean said filters; and a return duct connecting said supply duct back to the exhaust duct.

5. The apparatus of claim 4 further comprising:

a damper positioned within the exhaust duct between said supply duct and said return duct.

6. The apparatus of claim 4 further comprising:

an auxiliary duct connecting said supply duct with the inlet chamber of said housing.

7. The apparatus of claim 6 further comprising:

an auxiliary valve located within said auxiliary duct to adjust flow from said supply duct into the inlet chamber of said housing.

8. The apparatus of claim 6 further comprising:

a check valve positioned within said auxiliary duct to prevent flow from the inlet chamber of said housing into said supply duct.

* * * * *

UNITED STATES PATENT AND TRADEMARK OFFICE
CERTIFICATE OF CORRECTION

PATENT NO. : 5,405,421
DATED : April 11, 1995
INVENTOR(S) : George W. Swisher, Jr.

It is certified that error appears in the above-indentified patent and that said Letters Patent is hereby corrected as shown below:

Column 2, line 12, delete "!".

Column 2, line 38, replace "humeral" with --numeral--.

Column 3, line 24, replace "in]Let" with --inlet--.

Column 5, line 25, replace "out]Let" with --outlet--.

Column 7, line 13, after "filters;" begin a new paragraph with the word "a".

Signed and Sealed this

Twenty-ninth Day of August, 1995

Attest:

BRUCE LEHMAN

Attesting Officer     Commissioner of Patents and Trademarks